(12) United States Patent
Hoffman

(10) Patent No.: US 6,324,288 B1
(45) Date of Patent: Nov. 27, 2001

(54) CIPHER CORE IN A CONTENT PROTECTION SYSTEM

(75) Inventor: Jeffrey D. Hoffman, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/313,133

(22) Filed: May 17, 1999

(51) Int. Cl.⁷ .................................................. G06F 1/24
(52) U.S. Cl. ........................ 380/249; 380/265; 380/37
(58) Field of Search .................................. 380/249, 265, 380/37, 42

(56) References Cited

U.S. PATENT DOCUMENTS

| | | | | |
|---|---|---|---|---|
| 5,161,191 | * | 11/1992 | Gupta et al. ............................ | 380/37 |
| 5,161,194 | * | 11/1992 | Ujiie .................................... | 713/160 |
| 5,673,319 | * | 9/1997 | Bellare et al. ....................... | 713/181 |
| 5,835,599 | * | 11/1998 | Buer ..................................... | 380/29 |
| 5,838,794 | * | 11/1998 | Mittenthal ............................ | 380/28 |
| 5,943,319 | * | 8/1999 | Fraser .................................. | 370/259 |
| 6,026,490 | * | 2/2000 | Johns-Vano et al. ................ | 713/200 |

OTHER PUBLICATIONS

Pearson, Digital Transmission Content Protection, Jun. 16, 1999, Intel Corp. presentation, p. 18.*
Hitachi et al., 5C Digital Transmission Content Protection White Paper, Jul. 14, 1998, Revision 1.0.*

\* cited by examiner

*Primary Examiner*—Thomas R. Peeso
(74) *Attorney, Agent, or Firm*—Steven P. Skabrat (57) ABSTRACT

A cipher system having a cipher core to encrypt plaintext data into ciphertext data, and a bus interface coupled to the cipher core to transfer the ciphertext data to a bus. In one embodiment, the cipher core comprises a block assembler to receive words of data and to assemble the words into a block, an encryption function to encrypt the block based on an encryption function key, a block transmitter to receive the encrypted block and to disassemble the encrypted block into encrypted data words, and a controller to control multiple rounds of encryption by the encryption function for the block. In another embodiment, the encryption function is duplicated and the controller is replaced by two controllers, the first controller controlling the first five rounds of encryption of the block and the second controller controlling the second five rounds of encryption of the block.

25 Claims, 10 Drawing Sheets

CIPHER CORE IN A CONTENT PROTECTION SYSTEM

BACKGROUND

1. Field

The present invention relates generally to cryptographic systems and, more specifically, to hardware implementations of ciphers.

2. Description

Digital content is widely distributed to and among various electronic systems such as computers, networks, and consumer electronics devices, for example. The content may be audio data, video data, still image data, software, text, or any other information that may be stored in a digital form and conveyed to a user. Once the content is in a digital form, it may be easily copied or captured when the content is stored within a component of a system or is transmitted from one component to another. Developers and owners of digital content struggle to protect their intellectual property rights in the content in the face of rapid technological changes relating to such equipment. One approach to protecting the digital content is through the use of cryptography. Cryptographic systems may be used to encrypt the digital content so that only an authorized user may decrypt the encrypted data.

Various cryptographic systems are used to protect digital content. One system is the Five Company (5C) Digital Transmission Content Protection (DTCP) scheme. The DTCP approach provides manufacturers of electronic equipment with a simple and inexpensive cryptographic implementation, while maintaining a high degree of security. The DTCP approach defines a cryptographic protocol for protecting audio/video entertainment content from illegal copying, intercepting and tampering as the content traverses high performance digital buses, such as buses conforming to the Institute of Electrical and Electronics Engineers (IEEE) 1394–1995 Standard for a High-Speed Performance Serial Bus (IEEE 1394). Only legitimate entertainment content delivered to an electronics device via the same or another approved copy protection system will be protected by this copy protection system. A number of emerging technologies are taking advantage of the IEEE 1394 high speed digital interface, including desktop computer systems, digital versatile disk (DVD) players, digital televisions, and digital set top box receivers. The transparent DTCP framework used in such devices allows consumers to enjoy high quality digital pictures and sound without any noticeable performance or quality impact due to the content protection scheme.

For the DTCP approach to be widely accepted, low cost encryption and decryption components which can implement content protection without unduly delaying transmission of the digital content or causing inconvenience to the user are needed. No such components currently exist. The present invention is intended to overcome this deficiency and other disadvantages of the prior art.

SUMMARY

An embodiment of the present invention is a cipher system having a cipher core to encrypt plaintext data into ciphertext data, and a bus interface coupled to the cipher core to transfer the ciphertext data to a bus.

In one embodiment, the cipher core comprises a block assembler to receive words of data and to assemble the words into a block, an encryption function to encrypt the block based on an encryption function key, a block transmitter to receive the encrypted block and to disassemble the encrypted block into encrypted data words, and a controller to control multiple rounds of encryption by the encryption function for the block.

In another embodiment, the cipher core comprises a block assembler to receive words of data and to assemble the words into a block, first and second encryption functions to encrypt the block based on an encryption function key, a block transmitter to receive the encrypted block and to disassemble the encrypted block into encrypted data words, a first controller to control a first set of rounds of encryption for the block by the first encryption function, and a second controller to control a second set of rounds of encryption for the block by the second encryption function.

BRIEF DESCRIPTION OF THE DRAWINGS

The features and advantages of the present invention will become apparent from the following detailed description of the present invention in which.

DETAILED DESCRIPTION

The Five Company (5C) Digital Transmission Content Protection (DTCP) scheme defines a cryptographic protocol for protecting audio/video entertainment content from unauthorized copying, intercepting, and tampering as it traverses digital transmission mechanisms such as a high-performance serial bus that conforms to the IEEE 1394–1995 standard. One component of the content protection system is a content cipher subsystem implementing a cipher called the M6-S56 cipher, which may be used to encrypt/decrypt content traversing the serial bus. This cipher may be used in converted cipher block chaining mode, which provides greater security than ordinary cipher block chaining. The M6-S56 cipher is a common key block cipher algorithm based on permutation-substitution. Various embodiments of the present invention comprise implementations of the content cipher subsystem for the M6-S56 cipher operating in an encryption mode. However, other embodiments may implement other ciphers. Additionally, the content cipher subsystem discussed herein may be modified to provide the decryption capability.

Embodiments of the present invention comprise a content cipher subsystem having a central cipher component called a "cipher core" herein. One embodiment of the present invention has been optimized for small size, in terms of number of gates in a hardware implementation ("small cipher core"). A second embodiment has been optimized for high throughput ("fast cipher core"). A third embodiment has been optimized for low noise operation and easy synthesis ("quiet cipher core").

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
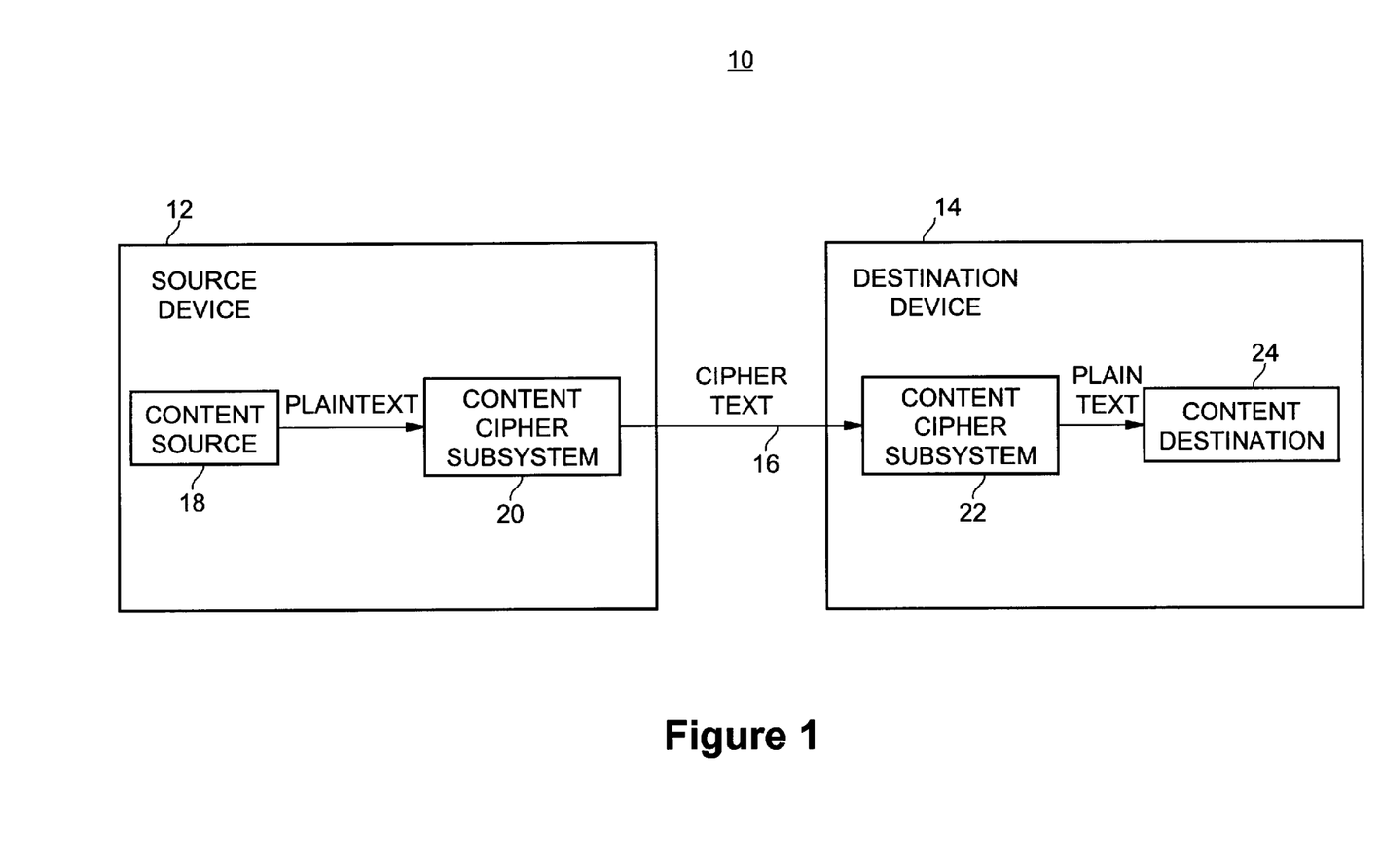
FIG. 1 is a diagram illustrating source and destination devices using a cipher in an encryption system according to an embodiment of the present invention.

FIG. 1 is a diagram illustrating source and destination devices using a cipher in a content protection system 10 according to an embodiment of the present invention. A source device 12 may be coupled to a destination device 14 by a high speed serial bus such as an IEEE 1394 bus 16, although the invention is not limited in scope in this respect. Source and destination devices may be personal computers (PCs), digital video cassette recorders (DVCRs), DVD players, digital televisions, computer monitors, stereo equipment, set top boxes, or any electronics equipment capable of storing, transmitting or displaying digital content. At least one content source 18 within source device 12 provides unencrypted digital content called plaintext data. Content source 18 may be a compact disc read only memory (CD-ROM), a digital versatile disc (DVD), a hard drive, or any other digital storage medium. The content may be, for example, a video, music, software, or any other digital data. Alternatively, content source may be a communications interface to a communications device, such as a satellite, cable, fiber optic link, or wireless link, for example. The plaintext may be received by content cipher subsystem 20, which may be configured to encrypt the plaintext into ciphertext using a cipher and to send the ciphertext over the IEEE 1394 interface. Destination device 14 comprises a corresponding content cipher subsystem 22 which may be configured to decrypt the ciphertext back into plaintext. The plaintext may be rendered to a user (not shown) by content destination 24 by displaying on a monitor or by generating audio output through loudspeakers, for example. Thus, content protection system 10 protects the digital content during transmission between components. Alternatively, digital content may also be encrypted by another encryption scheme while stored on content source 18 or at content destination 24, thereby providing an additional layer of security.

Figure 2:
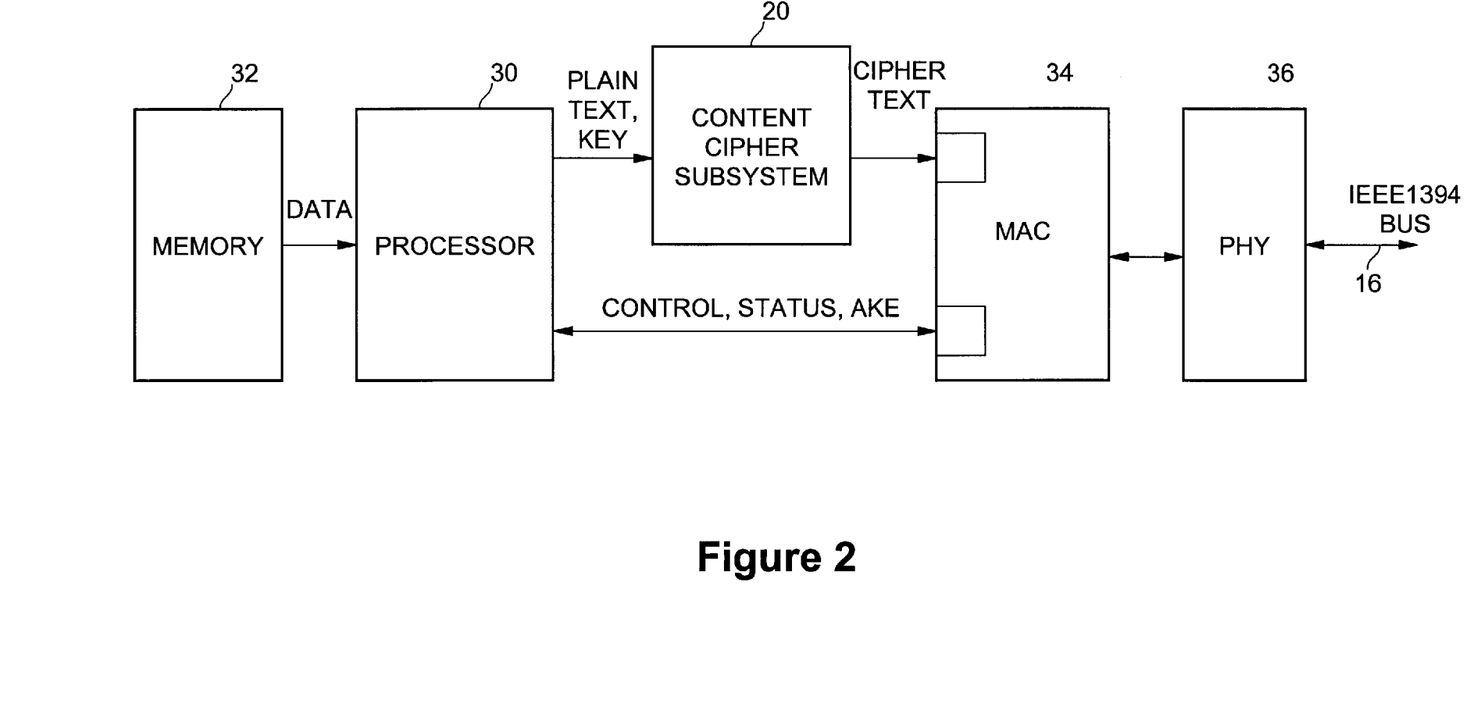
FIG. 2 is a diagram of the data flow between components of a source device according to an embodiment of the present invention.

FIG. 2 is a diagram of the data flow between components of a source device according to an embodiment of the present invention. A source device may comprise a processor 30 and a memory 32. In one embodiment, the memory comprises a dynamic random access memory (DRAM), although other memories may also be used. The memory may store at least a portion of the digital content received from the content source. When the digital content is Motion Picture Experts Group (MPEG) data, the memory may store packetized elementary streams (PES). Processor 30 coordinates the usage of content cipher subsystem 20 and sends plaintext data and at least one key to the content cipher subsystem. The key may be used by the content cipher subsystem to encrypt the plaintext data according to a cipher. The content cipher subsystem sends the ciphertext generated from the plaintext over an isochronous link to a media access controller (MAC) 34. When the bus used in the encryption system is the IEEE 1394 bus, the MAC comprises a 1394 Link Layer Controller. The ciphertext data may be further transferred to a physical layer (PHY) interface 36 before transmission onto the bus. When the bus used in the encryption system is the IEEE 1394 bus, the PHY comprises a 1394 Physical Layer Transceiver/Arbiter. Control and status messages, as well as authentication and key exchange (AKE) information, may be transmitted between processor 30 and MAC 34 over an asynchronous link.

The content cipher subsystem accepts key, clear data, and encrypt data messages from processor 30. A key message sets the key for subsequent content encryption. Clear data messages may bypass the cipher and be forwarded to MAC interface 34 without encryption. Encrypt data messages include content to be encrypted. In various embodiments, the content cipher subsystem provides input buffering to absorb cipher latency, automatic IEEE 1394 packetization and header insertion, and built in test and performance measurement functions. Synchronous design techniques are employed throughout the design of the embodiments to ensure reliable operation at high clock frequencies and a reliable synthesis.

Each embodiment of content cipher subsystem 20 may be used as a core component of content protection system 10 and may be implemented in a field programmable gate array (FPGA), complex programmable logic device (CPLD), an application specific integrated circuit (ASIC), or a custom digital integrated circuit. When the cipher used is the M6-S56 cipher, each embodiment disclosed herein performs all of the functions of the M6-S56 cipher operating in Converted Cipher Block Chaining (C-CBC) mode as defined by the M6 Digital Content Protection Specification, Volume 1, Revision 0.91, Oct. 8, 1998, and Volume 2, Revision 0.8997, Oct. 2, 1998, although the invention is not limited in scope in this respect.

Figure 3:
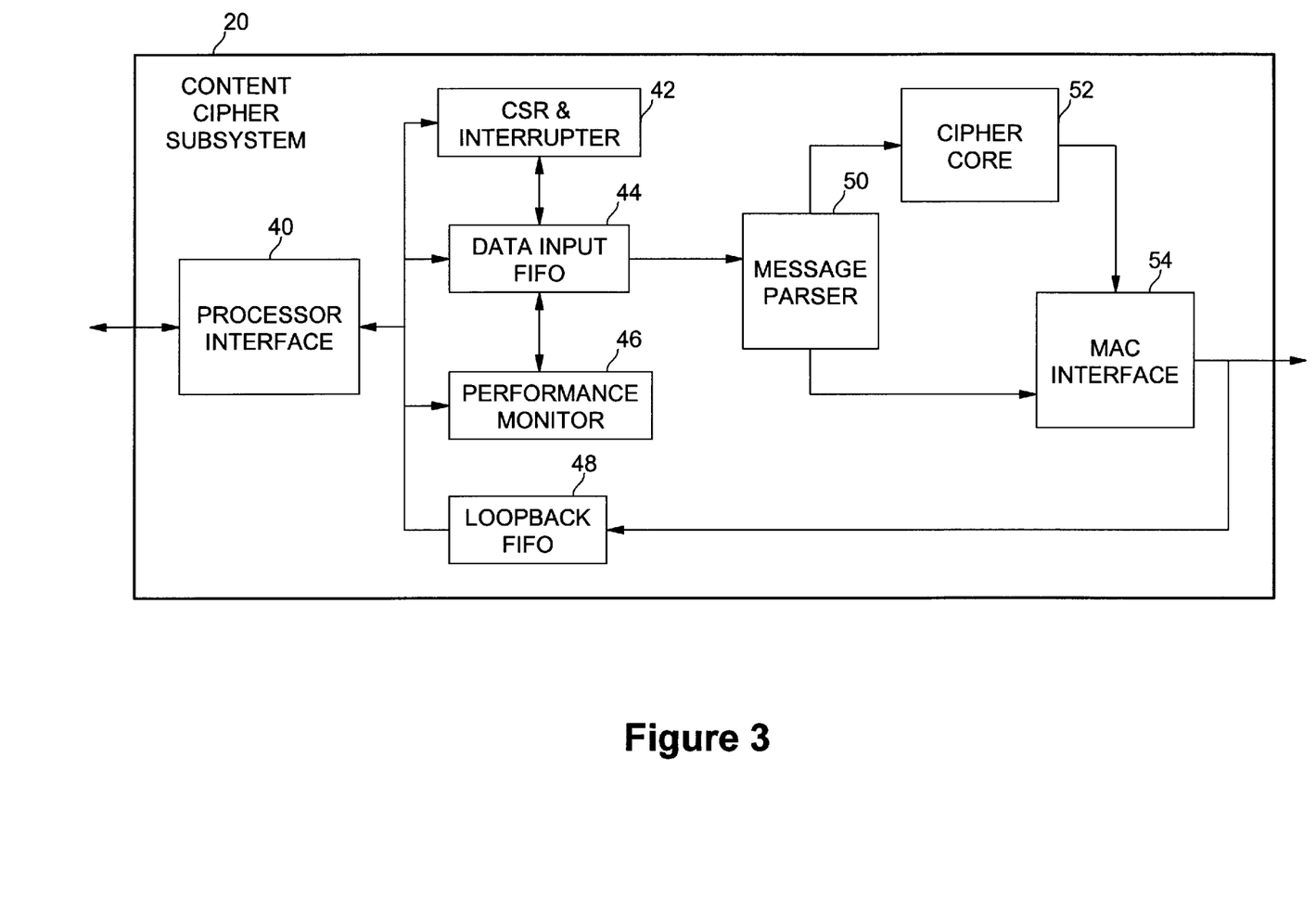
FIG. 3 is a diagram of a content cipher subsystem according to an embodiment of the present invention.

FIG. 3 is a diagram of a content cipher subsystem according to an embodiment of the present invention. Processor interface 40 may be coupled to processor 30 (not shown in FIG. 3) to provide a means of communication between the cipher subsystem and the processor. Data and key messages, control and status, performance parametrics, built in test data and interrupts are conveyed through this interface. Control status register (CSR) and interrupter 42 may be used to control the configuration of the content cipher subsystem and to interrupt the processor via the processor interface. Data input first in first out (FIFO) buffer 44 stores streaming data received from the processor. Performance monitor 46 monitors how the content cipher subsystem is performing in processing the data received from the processor and outputting the encrypted data to the IEEE 1394 bus. Loopback FIFO 48 may be used to test the content cipher subsystem using the CSR. It provides capabilities for built-in test. Each of the CSR and interrupter 42, data input FIFO 44, performance monitor 46, and loopback FIFO 48 components may be optional in various embodiments. Message parser 50 performs message parsing, payload routing, and automatic packetization, thus abstracting these functions from the software running on the processor. It interprets the messages received from the processor by examining the headers of the messages. As discussed above, messages include clear data messages, wherein the data may bypass the cipher, key messages, wherein the message contains a key for the cipher, and encrypt data messages, wherein the data may be processed by the cipher. When the message is a key message, the key data payload is loaded into the cipher core. When the message is an encrypt data message, the payload portion is divided into packets and forwarded to cipher core 52 while IEEE 1394 isochronous packet headers are sent directly to the MAC interface bypassing the cipher core 52. When the message is a clear data message, the payload is divided into packets and both headers and payload are forwarded directly to MAC interface 54 bypassing the cipher core 52. Cipher core 52 performs encryption processing and will be discussed in further detail below. MAC interface 54 couples the cipher core to the IEEE1394 MAC 34 (not shown in FIG. 3).

Figure 4:
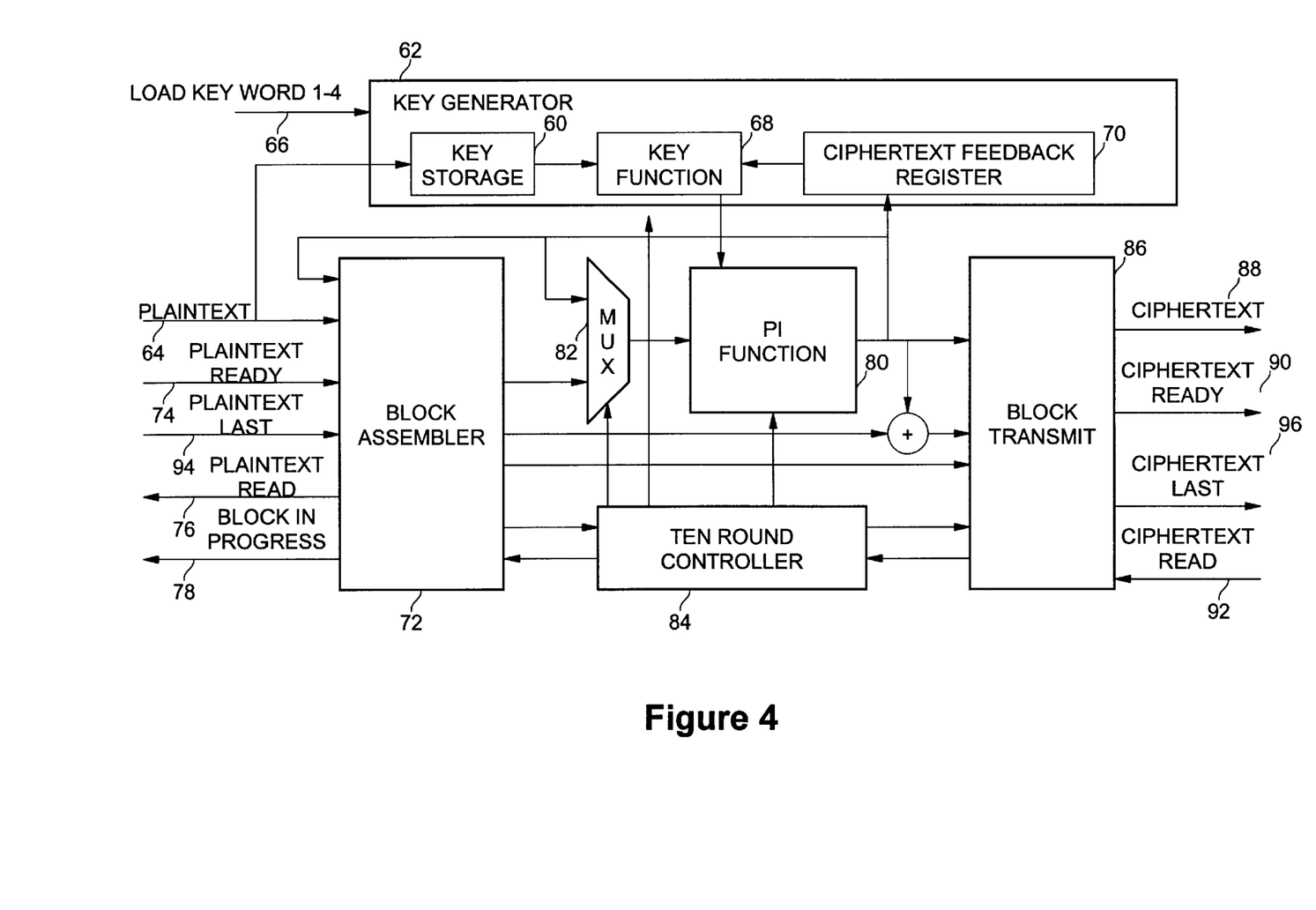
FIG. 4 is a diagram of a cipher core optimized for small size according to an embodiment of the present invention.

In one embodiment, a cipher core 52 of content cipher subsystem 20 may be optimized for minimal chip resource usage. FIG. 4 is a diagram of a cipher core optimized for small size according to an embodiment of the present invention. The operation of this small M6 cipher core may be summarized as follows.

The message parser of the content cipher subsystem loads a content key having 64 bits into Key Storage 60 of Key Generator 62, one 16-bit word at a time. It does so by driving key data onto the Plaintext input line 64 and driving the corresponding Load Key Word line 66 high, where Load Key Word 1 loads the most significant word (MSW) of the key and Load Key Word 4 loads the least significant word (LSW) of the key. Key Function 68 accepts the content key and ciphertext feedback from Ciphertext Feedback Register 70 as input parameters and generates a Pi Function key. In one embodiment, only the least significant 56 bits of the 64-bit content key are used by the Key Function. The Ciphertext Feedback Register in the Key Generator may be initially cleared (i.e., zeroed) on reset or power up of the system.

The message parser of the content cipher subsystem then loads plaintext data into Block Assembler 72, one 16-bit word at a time, most significant word first. It does so by driving the plaintext data onto the Plaintext input line 64 and driving Plaintext Ready line 74 high. The Block Assembler acknowledges each word transferred by driving Plaintext Read line 76 high. The Block Assembler assembles four words of plaintext into a 64-bit block. While a block is being assembled, the Block Assembler drives Block in Progress line 78 high and holds the line high until the entire assembled block has been transferred to Pi Function 80 through multiplexor (MUX) 82. As blocks become available, the Block Assembler initiates a state machine in Ten Round Controller 84 to begin encrypting a block. Once the Ten Round Controller starts, the Block Assembler begins assembling the next block of plaintext data.

Ten Round Controller 84 initially loads an assembled block from Block Assembler 72 into Pi Function 80. It then delays while the Pi Function output settles. Pi Function 80 generates the ciphertext based on the plaintext and the Pi Function key. The Ten Round Controller then reloads the Pi Function from its own output and delays again. This process of reload and delay may be repeated eight more times for a total of ten rounds. Pi Function 80 accepts a block of plaintext and a key as input parameters and outputs a block of ciphertext. There may be three variants of the Pi Function. The 5C DTCP scheme assigns each round one of the variants. Variant selection is under the control of the Ten Round Controller.

On the fifth round, the partially encrypted block may be loaded into Ciphertext Feedback Register 70 in Key Generator 62. The partially encrypted block may be used along with the content key to calculate the Pi Function key to be used to encrypt the next plaintext block. On the tenth round, the fully encrypted ciphertext block may be loaded into Block Transmitter 86 and Key Function 68 output may be updated. A state machine within the Block Transmitter may then be initiated. As fully encrypted ciphertext blocks become available, the Block Transmitter disassembles them into 16-bit words and transmits them one word at a time, most significant word first, to the MAC interface. It does so by driving the ciphertext data onto the Ciphertext output line 88 and driving Ciphertext Ready line 90 high. The MAC interface acknowledges the transfer of each word by driving Ciphertext Read line 92 high.

The last word of an encryption frame may be indicated when the message parser drives Plaintext Last line 94 high accompanying the last word of plaintext data. At this point, there are two possible conditions which dictate how the cipher will proceed. If the encryption frame ends on a complete block (i.e., if the size of the frame in bits is an integer multiple of 64), the cipher core encrypts and transmits that block in the same manner as the preceding blocks, except that the last word of ciphertext may be accompanied by Ciphertext Last line 96 driven high. If the encryption frame ends on a partial block (i.e., the size of the frame in bits is not an integer multiple of 64), the previous ciphertext block may be reloaded into the Pi Function and 10 more rounds may be executed on it. The least significant portion of the result equal to the size of the partial block which ended the frame may then be exclusive OR'ed with the as yet unencrypted partial block. The final result, the encrypted partial block, may then be transmitted to the MAC interface with the last word of ciphertext accompanied by Ciphertext Last line 96 driven high. Only the number of words present in the partial block which ended the frame may be transferred to the MAC interface.

The content cipher subsystem must not change the content key until an entire encryption frame has been processed through the cipher. Once the last ciphertext word of a frame is transferred to the external system, Ciphertext Feedback Register 70 in Key Generator 62 may be cleared (i.e., zeroed), Block in Progress line 78 may be driven low, and a new encryption frame can begin. The new encryption frame can either reuse the previous content key without reloading it or a new content key may be loaded into Key Storage 60 prior to loading of plaintext data.

Figure 5:
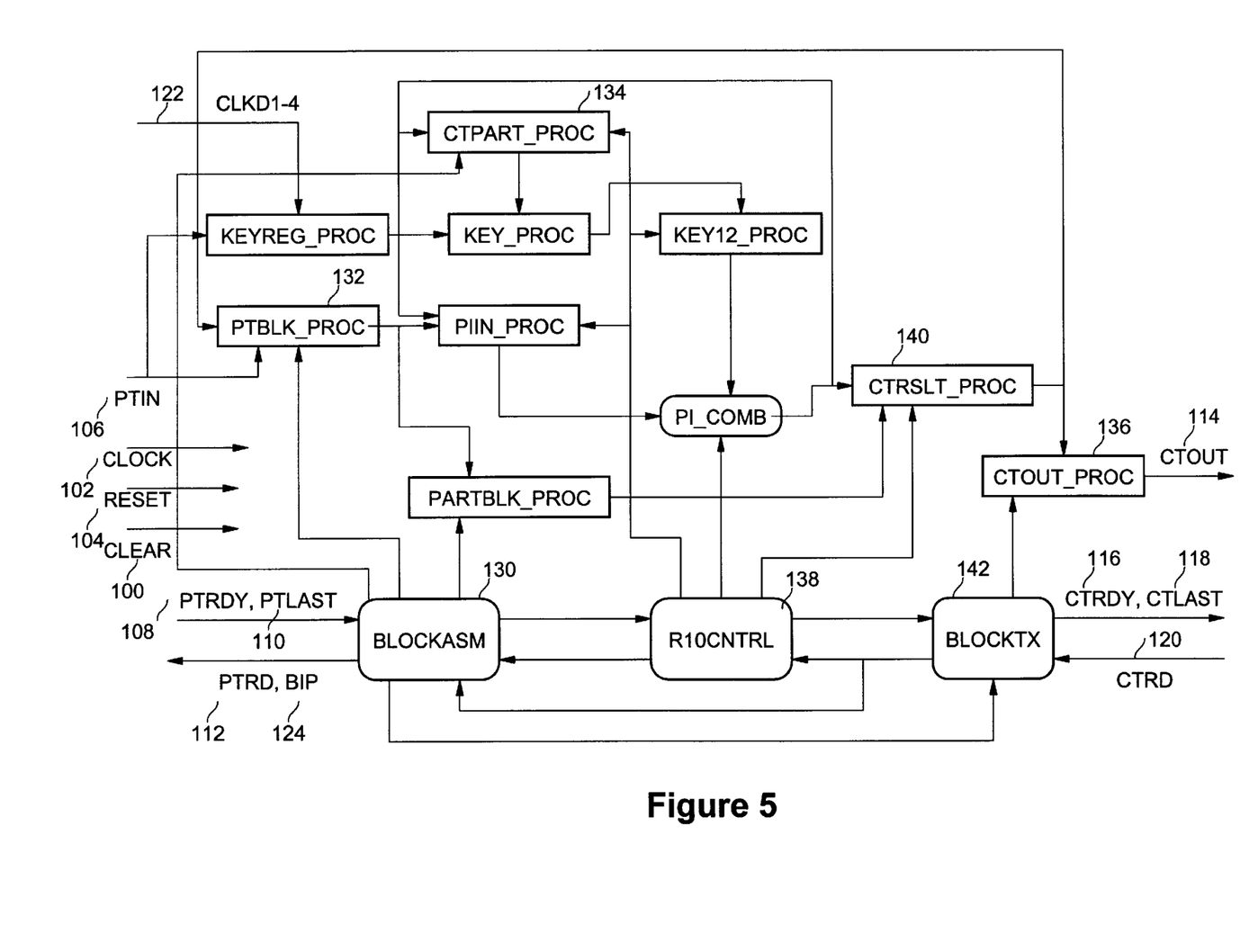
FIG. 5 is a structural block diagram of the small cipher core according to one embodiment of the present invention.

The cipher core implementing the M6-S56 C-CBC cipher may be described hierarchically in the very high speed integrated circuit (VHSIC) hardware design language (VHDL) syntax. The architecture comprises subcomponents and processes interconnected with concurrent signal assignments. Each component may be parameterized in order to simplify modification should the need arise. In one embodiment, the top level design entity of the cipher core may be implemented as the m6_small component. FIG. 5 is a structural block diagram of the small cipher core according to one embodiment of the present invention.

In one embodiment, the input and output ports of the small cipher core may be defined in the following entity statement.

The Small Cipher Core entity
library ieee;
use ieee.std_logic_1164.all; -- standard nine value logic system
use work.constants.all; -- global design parameters
entity m6_small is
    port

```
(clock: in std_logic; -- system clock
clear: in std_logic; -- asynchronous clear
reset: in std_logic; -- synchronous reset
ptin: in std_logic_vector(WORDSIZE-1 downto 0); --
    plain text
ptrdy: in std_logic; -- plaintext ready
ptlast: in std_logic; -- plaintext last
ptrd: out std_logic; -- plaintext read
ctout: out std_logic_vector(WORDSIZE-1 downto
    0); -- cipher text
ctrdy: out std_logic; -- ciphertext ready
ctlast: out std_logic; -- ciphertext last
ctrd: in std_logic; -- ciphertext read
bip: out std_logic; -- block in progress
ckld1: in std_logic; -- content key word 1 load
ckld2: in std_logic; -- content key word 2 load
ckld3: in std_logic; -- content key word 3 load
ckld4: in std_logic); -- content key word 4 load
end m6_small;
```

All signals, with the exception of Clear signal 100, may be synchronous with respect to Clock signal 102. Input signals may be sampled and output signals changed on the rising edge of Clock signal 102. Clear signal 100 may be asynchronous and may be used as a power on reset. Synchronous Reset signal 104 performs the same function as the Clear signal except it is synchronous to the Clock signal. It resets the cipher to a clear state (e.g., ready to accept content key and plaintext). Signals Ptin 106, Ptrdy 108, Ptlast 110, and Ptrd 112 comprise the plaintext input interface. Signals Ctout 114, Ctrdy 116, Ctlast 118, and Ctrd 120 comprise the ciphertext output interface. Ckld1–4 signals 122 may be used along with the Ptin signal to load a 56-bit content key. Bip signal 124 comprises a status indicator to the message parser. All signals use positive logic.

Figure 6:
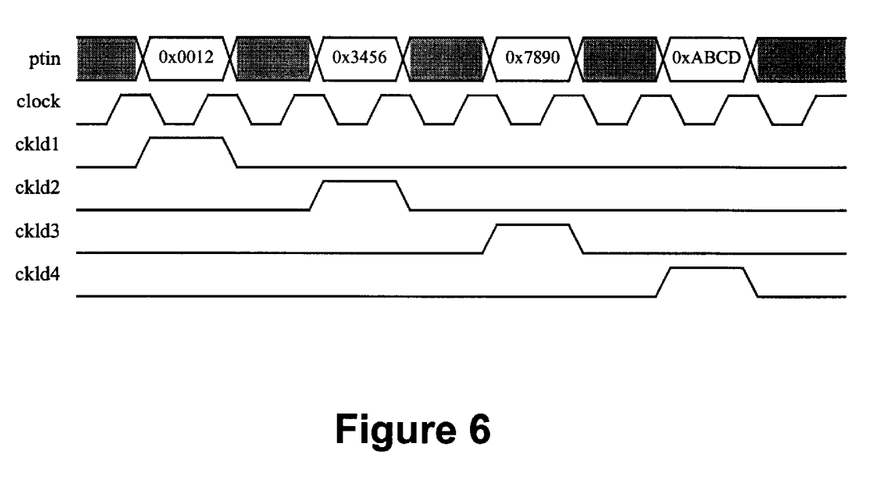
FIG. 6 is a waveform diagram of content key loading processing according to an embodiment of the present invention.

FIG. 6 is a waveform diagram of content key loading processing according to an embodiment of the present invention. A 56-bit content key may be loaded into the cipher core by driving key data onto the Ptin input signal 106 and driving the corresponding Ckld1–4 signal 122 high where ckld1 loads the most significant word (MSW) and ckld4 loads the least significant word (LSW). The waveform shown in FIG. 6 illustrates a load of an example content key 0×1234567890abcd.

Figure 7:
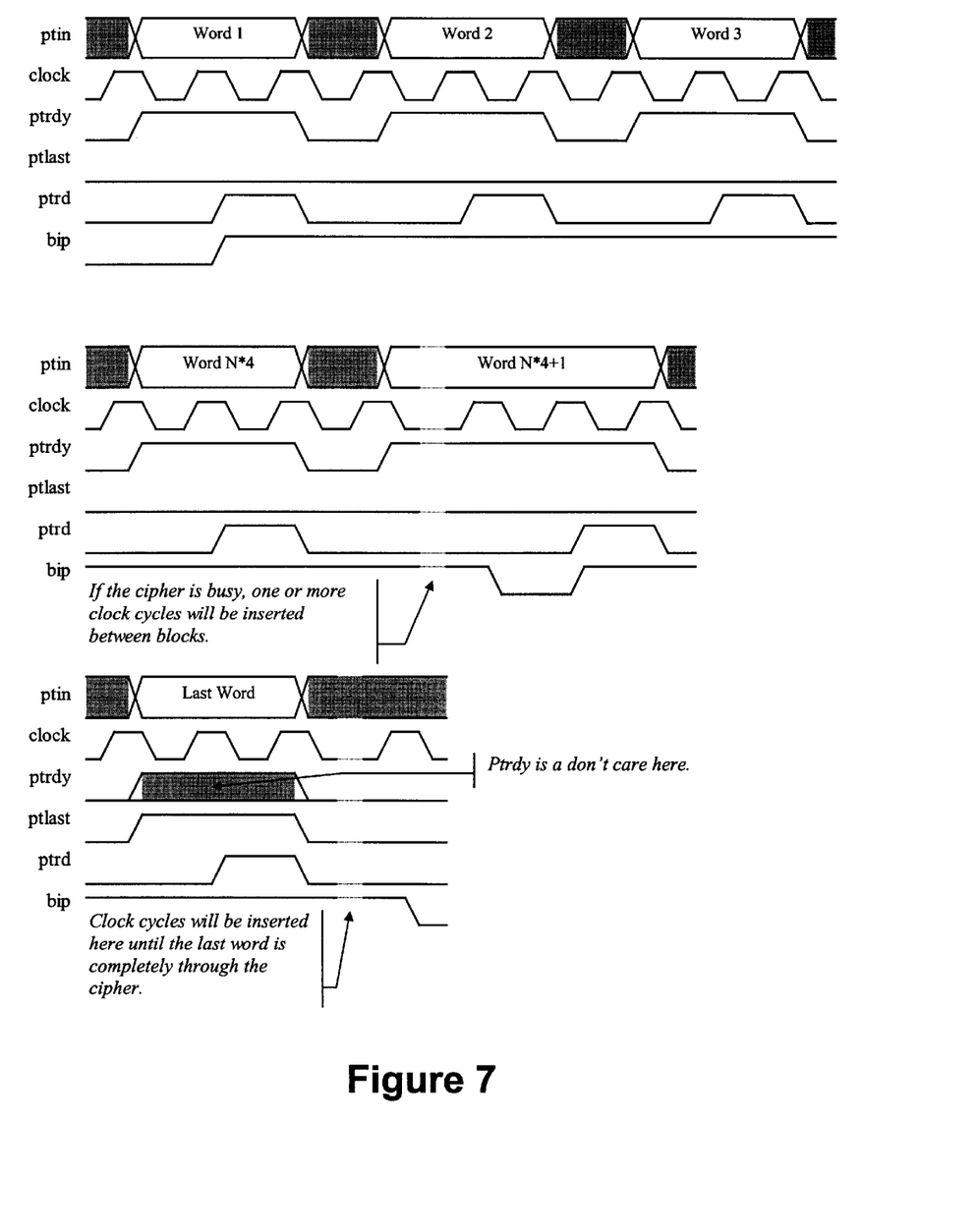
FIG. 7 is a waveform diagram of plaintext loading processing according to an embodiment of the present invention.

FIG. 7 is a waveform diagram of plaintext loading processing according to an embodiment of the present invention. Plaintext data may be loaded into the cipher core one 16-bit word at a time, most significant word first, by driving plaintext data onto the Ptin 106 input signal and driving Ptrdy 108 high. The cipher core acknowledges the transfer of each word by driving Ptrd 112 high. The last word of plaintext in a cipher frame may be indicated by driving Ptlast 110 high accompanying the last word of plaintext data. The waveform shown in FIG. 7 illustrates loading one frame of plaintext into the cipher core.

Figure 8:
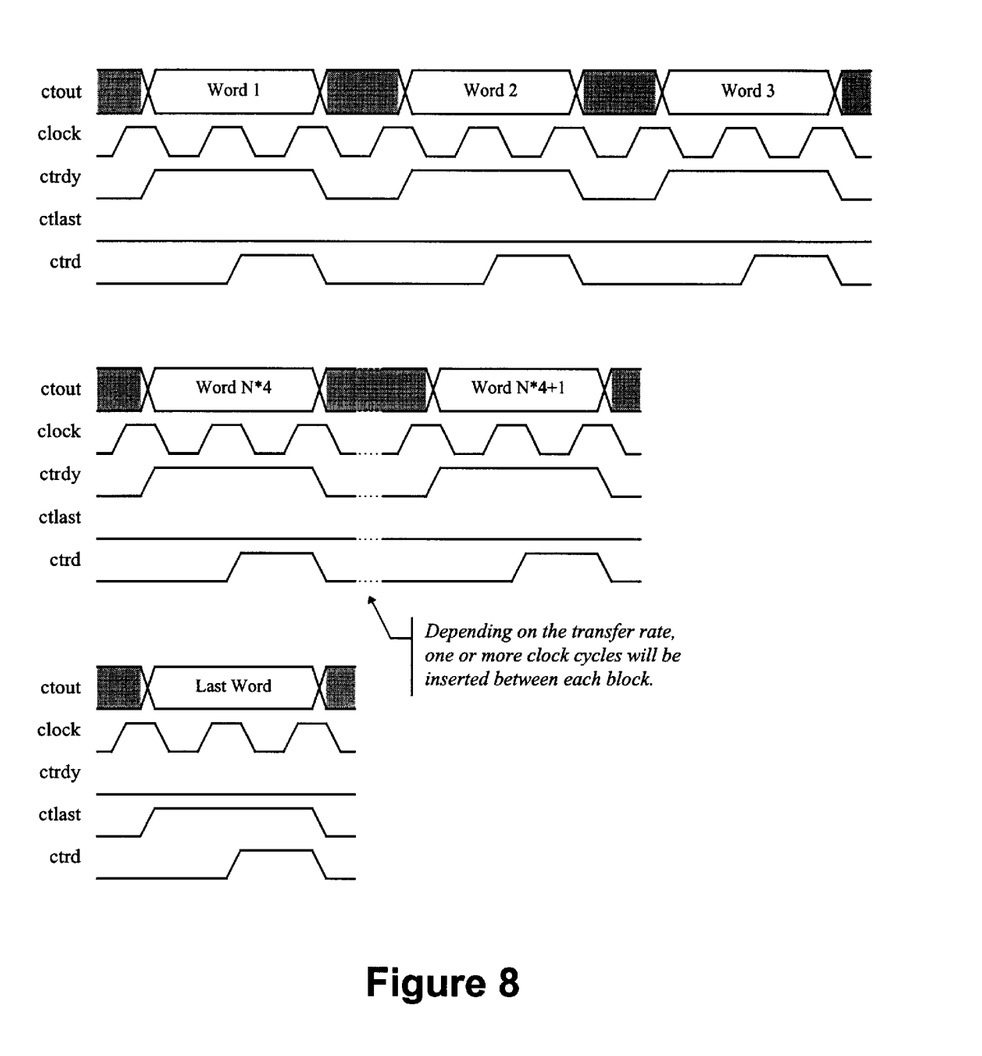
FIG. 8 is a waveform diagram of ciphertext unloading processing according to an embodiment of the present invention.

FIG. 8 is a waveform diagram of ciphertext unloading processing according to an embodiment of the present invention. Ciphertext may be unloaded from the cipher core one 16-bit word at a time, most significant word first, by accepting ciphertext data from the Ctout port 114 whenever Ctrdy 116 is sensed high. The MAC interface acknowledges the transfer of each word by driving Ctrd 120 high. The last word of ciphertext in a cipher frame may be indicated when Ctlast 118 is sensed high accompanying the last word of ciphertext data. The waveform shown in FIG. 8 illustrates unloading one frame of ciphertext from the cipher.

Referring back to FIG. 5, the Block Assembler component, Blockasm 130, controls the assembly of 64-bit cipher blocks from the 16-bit plaintext words loaded by the message parser, initiates the Ten Round Controller whenever a block is ready, controls the encryption of partial blocks ending a cipher frame, and clears the Ciphertext Feedback Register between cipher frames. In one embodiment, the input and output ports of the Block Assembler may be defined in the following entity statement.

```
The Block Assembler entity
library ieee;
use ieee.std_logic_1164.all;
entity blockasm is
    port
        (clock: in std_logic; -- system clock
        clear: in std_logic; -- asynchronous clear
        reset: in std_logic; -- synchronous reset
        ptrdy: in std_logic; -- plaintext ready
        ptlast: in std_logic; -- last plaintext word
        bipin1: in std_logic; -- block in progress (1st stage)
        bipin2: in std_logic; -- block in progress (2nd stage)
        bipin3: in std_logic; -- block in progress (tx stage)
        ptrd: out std_logic; -- plaintext read
        ldwrd1: out std_logic; -- load word 1
        ldwrd2: out std_logic; -- load word 2
        ldwrd3: out std_logic; -- load word 3
        ldwrd4: out std_logic; -- load word 4
        ldpart: out std_logic; -- load partial block
        init: out std_logic; -- cipher initialize
        go: out std_logic; -- cipher go
        partwrd1: out std_logic; -- partial block (1 word)
        partwrd2: out std_logic; -- partial block (2 word)
        partwrd3: out std_logic; -- partial block (3 word)
        lastblk: out std_logic; -- last block
        bip: out std_logic); -- block in progress
end blockasm;
```

Input signals ptrdy, ptlast, and output signal ptrd may be used to handshake plaintext data transfers from the message parser. Input signals bipin1–3 provide the Block Assembler with the state of the Ten Round Controller and Block Transmit components. Output signals ldwrd1–4 may be used in process ptblk_proc 132 to sequence the loading of plaintext words into a plaintext block. Output signal ldpart causes process ptblk_proc to reload the previously encrypted cipher text block for re-encryption (this is only used when a cipher frame ends in a partial block). Output signal init may be used in process ctpart_proc 134 to clear the Ciphertext Feedback Register. Output signal go may be used to initiate the state machine in the Ten Round Controller. Output signals partwrd 1–3 and lastblk may be used in process ctout_proc 136 and by the Block Transmit component to control the transmission of the last block of a cipher frame and the encryption of partial blocks. Output signal bip indicates the state of the cipher to the message parser.

The Ten Round Controller component, r10ctrl 138, controls the encryption of the individual 64-bit plaintext blocks. It includes a timer, which sets the duration of each round, allowing signals to settle through the Pi Function, and a state machine which keeps track of the rounds. In one embodiment, the input and output ports of the Ten Round Controller may be defined in the following entity statement.

```
The Ten Round Controller entity
library ieee;
use ieee.std_logic_1164.all;
entity r10ctrl is
    generic
        (ROUNDDLY: positive=3; -- round delay
        CNTRBITS: positive:=2); -- round delay counter bits
    port
```

(clock: in std_logic; -- system clock
clear: in std_logic; -- asynchronous clear
reset: in std_logic; -- synchronous reset
go: in std_logic; -- cipher go
bipin: in std_logic; -- block in progress (next stage)
blockrdy: out std_logic; -- ciphertext block done
enrnd1: out std_logic; -- enable round 1
enrnd2: out std_logic; -- enable round 2
enrnd3: out std_logic; -- enable round 3
enrnd4: out std_logic; -- enable round 4
enrnd5: out std_logic; -- enable round 5
enrnd6: out std_logic; -- enable round 6
enrnd7: out std_logic; -- enable round 7
enrnd8: out std_logic; -- enable round 8
enrnd9: out std_logic; -- enable round 9
enrnd10: out std_logic; -- enable round 10
Idpart: out std_logic; -- load the partial result register
Idrslt: out std_logic; -- load the final result register
Idfdbk: out std_logic; -- load the feedback register
Idnxtblk: out std_logic; -- load the next plain text block
bip: out std_logic); -- block is in progress
end r10ctrl;

Input signal go, driven by the Block Assembler, starts the Ten Round Controller's state machine. Input signal bipin provides the Ten Round Controller with the state of the Block Transmit component. Output signal blockrdy may be used to initialize the state machine in the Block Transmitter once a block has been encrypted. Output signals enrnd1–10 may be used to select the Pi Function variant to be used on a per round basis. Output signal Idpart may be used in process ctpart_proc 134 to load the fifth round partially encrypted ciphertext block into the Ciphertext Feedback Register. Output signal Idrslt may be used in process ctrslt_proc 140 to load the fully encrypted ciphertext block. Output signals Idfdbk and Idnxtblk may be used in process ptblk_proc 132 to select the source of data for the Pi Function. Ldfdbk selects the Pi Function output in preparation for execution of the next round. Ldnxtblk selects the Block Assembler output to begin encryption of the next plaintext block. Output signal bip provides the Block Assembler with the status of the Ten Round Controller.

Two embodiments of the Pi Function are provided in the present invention. In one embodiment, pi_comb comprises a combinatorial version of the Pi Function. Input signals trickle through the arithmetic operations combinatorially to arrive at the output lines asynchronously. This embodiment may be used when high throughput is desired. This embodiment is used in the small cipher core and the fast cipher core. In another embodiment, pi_seq comprises a sequential version of the Pi Function. Input signals are clocked sequentially through each consecutive arithmetic operation to arrive at the output lines synchronously. This embodiment may be used when low noise operation is desired. This embodiment is used in the quiet cipher core.

In one embodiment, the input and output ports of the Combinatorial Pi Function may be defined in the following entity statement.
The Combinatorial Pi Function entity
library ieee;
use ieee.std_logic_1164.all; -- IEEE std. nine value logic system
use work.constants.all; -- global constants
entity pi_comb is
   generic
      (S1: positive:=2; -- rotation index 1
      S2: positive:=11; -- rotation index 2
      S3: positive:=17); -- rotation index 3
   port
      (pi 123: in std_logic; -- pi variant 123 enable
      pi132: in std_logic; -- pi variant 132 enable
      pi213: in std_logic; -- pi variant 213 enable
      pi312: in std_logic; -- pi variant 312 enable
      key1: in std_logic_vector(BLOCKSIZE/2-1 downto 0); -- key 1
      key2: in std_logic_vector(BLOCKSIZE/2-1 downto 0); -- key 2
      input: in std_logic_vector(BLOCKSIZE-1 downto 0); -- in block
      output: out std_logic_vector(BLOCKSIZE-1 downto 0)); -- out block
end pi_comb;

The input signals pi123, pi132, p213, and pi312 select the Pi variant on a per round basis. Input signals key 1–2 comprise the two 32-bit Pi Function keys. Input comprises the 64-bit Pi function input block, and output comprises the 64-bit Pi Function output block.

In one embodiment, the input and output ports of the Sequential Pi Function may be defined in the following entity statement.
The Sequential Pi Function entity
library ieee;
use ieee.std_logic_1164.all; -- IEEE std. nine value logic system
use work.constants.all; -- global constants
entity pi_seq is
   generic
      (S1: positive:=2; -- first rotation index
      S2: positive:=11; -- second rotation index
      S3: positive:=17); -- third rotation index
   port
      (clock: in std_logic; -- system clock
      clear: in std_logic; -- asynchronous clear
      pi123: in std_logic; -- pi variant 123 enable
      pi132: in std_logic; -- pi variant 132 enable
      pi213: in std_logic; -- pi variant 213 enable
      pi312: in std_logic; -- pi variant 312 enable
      key1: in std_logic_vector(BLOCKSIZE/2-1 downto 0); -- key 1
      key2: in std_logic_vector(BLOCKSIZE/2-1 downto 0); -- key 2
      input: in std_logic_vector(BLOCKSIZE-1 downto 0); -- in block
      output: out std_logic_vector(BLOCKSIZE-1 downto 0)); -- out block
end pi_seq;

The input signals pi123, pi132, p213, and pi312 select the Pi variant on a per round basis. Input signals key1–2 comprise the two 32-bit Pi Function keys. Input comprises the 64-bit Pi function input block, and output comprises the 64-bit Pi Function output block.

The Block Transmit component, blocktx 142, controls the disassembly of 64-bit ciphertext blocks into 16-bit words and transfers them to the MAC interface. In one embodiment, the input and output ports of the Block Transmit may be defined in the following entity statement.
The Block Transmitter entity
library ieee;
use ieee.std_logic_1164.all;
entity blocktx is
   port
      (clock: in std_logic; -- system clock
      clear: in std_logic; -- asynchronous clear
      reset: in std_logic; -- synchronous reset partrdy1: in std_logic; -- partial block ready (one word)
partrdy2: in std_logic; -- partial block ready (two words)
partrdy3: in std_logic; -- partial block ready (three words)
blockrdy: in std_logic; -- ciphertext block ready
lastblk: in std_logic; -- last cipher text block of frame
ctrd: in std_logic; -- ciphertext read
blkwrd1: out std_logic; -- ciphertext block word 1 select
blkwrd2: out std_logic; -- ciphertext block word 2 select
blkwrd3: out std_logic; -- ciphertext block word 3 select
blkwrd4: out std_logic; -- ciphertext block word 4 select
partwrd1: out std_logic; -- partial block word 1 select
partwrd2: out std_logic; -- partial block word 2 select
partwrd3: out std_logic; -- partial block word 3 select
ctrdy: out std_logic; -- ciphertext ready
ctlast: out std_logic; -- last ciphertext word of frame
bip: out std_logic); -- block is in progress
end blocktx;

Input signal blockrdy, driven by the Ten Round Controller, starts the Block Transmit component's state machine. Input signals partrdy1–3 and lastblk, driven by the Block Assembler, indicate the end of cipher frame status. Input signals partrdy1–3 indicate that the frame ended in a partial block made up of one, two, or three words respectively. Input signal Lastblk indicates that the frame ended in a complete block. Output signals ctrdy, ctlast, and input signal ctrd may be used to handshake data transfers with the MAC interface. Output signals blkwrd1–4 and partwrd1–3 may be used in process ctout_proc 136 to select which ciphertext word to transfer to the MAC interface. Output signals Blkwrd1–4 select ciphertext word 1 (MSW) through 4 (LSW) respectively. Output signals Partwrd1–3 select partial block ciphertext words 1 through 3 respectively. Output signal bip provides the Ten Round Controller and Block Assembler with the status of the Block Transmit component.

Figure 9:
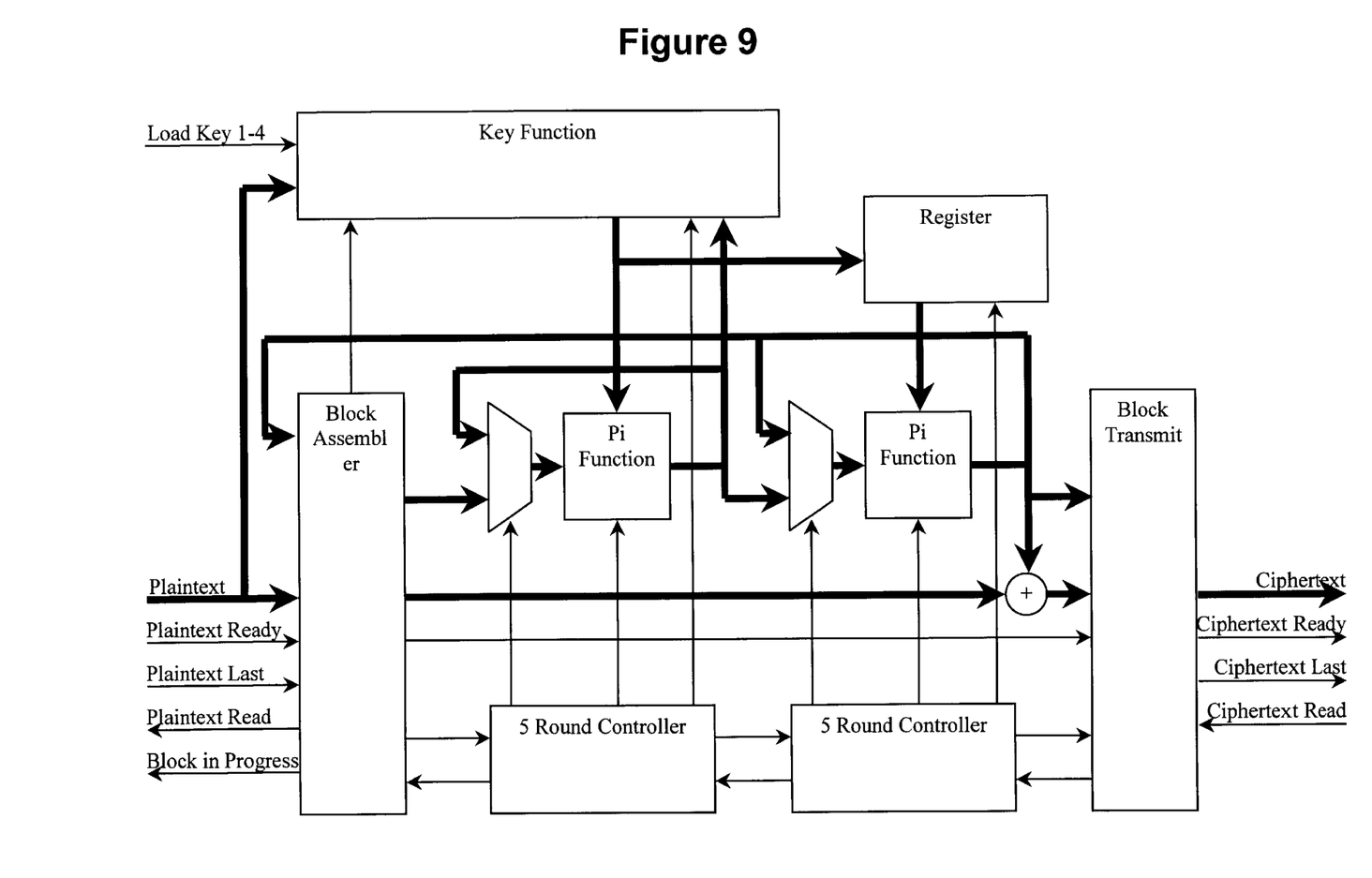
FIG. 9 is a diagram of a cipher core optimized for speed according to an embodiment of the present invention.

In another embodiment of the present invention, the cipher core may be optimized for high throughput. While this embodiment is larger in size (i.e., consumes more chip resources) than the small cipher core, it maintains a reasonable size for implementation in a FPGA or CPLD. FIG. 9 is a diagram of a cipher core optimized for speed according to an embodiment of the present invention. The operation of the fast cipher core is similar to that of the small version. One difference is that the Ten Round Controller has been replaced by two Five Round Controllers and the Pi Function with related circuitry has been duplicated. This architecture divides the cipher into two stages each executing five of the total ten rounds. The first stage executes rounds one through five and loads the Ciphertext Feedback Register in the Key Generator with the partially encrypted fifth round block. The second stage loads the partially encrypted fifth round block and the Pi Function key from the first stage then executes rounds six through ten. As soon as the second stage has started, the first stage begins encrypting the next block. In this manner, the cipher core concurrently processes two blocks at a time resulting in throughput approaching twice that of a single stage implementation. Encryption framing is handled in a similar manner as in the small version. A difference is that on a frame ending in a partial block, the previous block of cipher text may be recovered from the second stage and routed back into the first stage. Block assembly and transmission processing are similar to the processing provided by the small cipher core discussed above.

Figure 10:
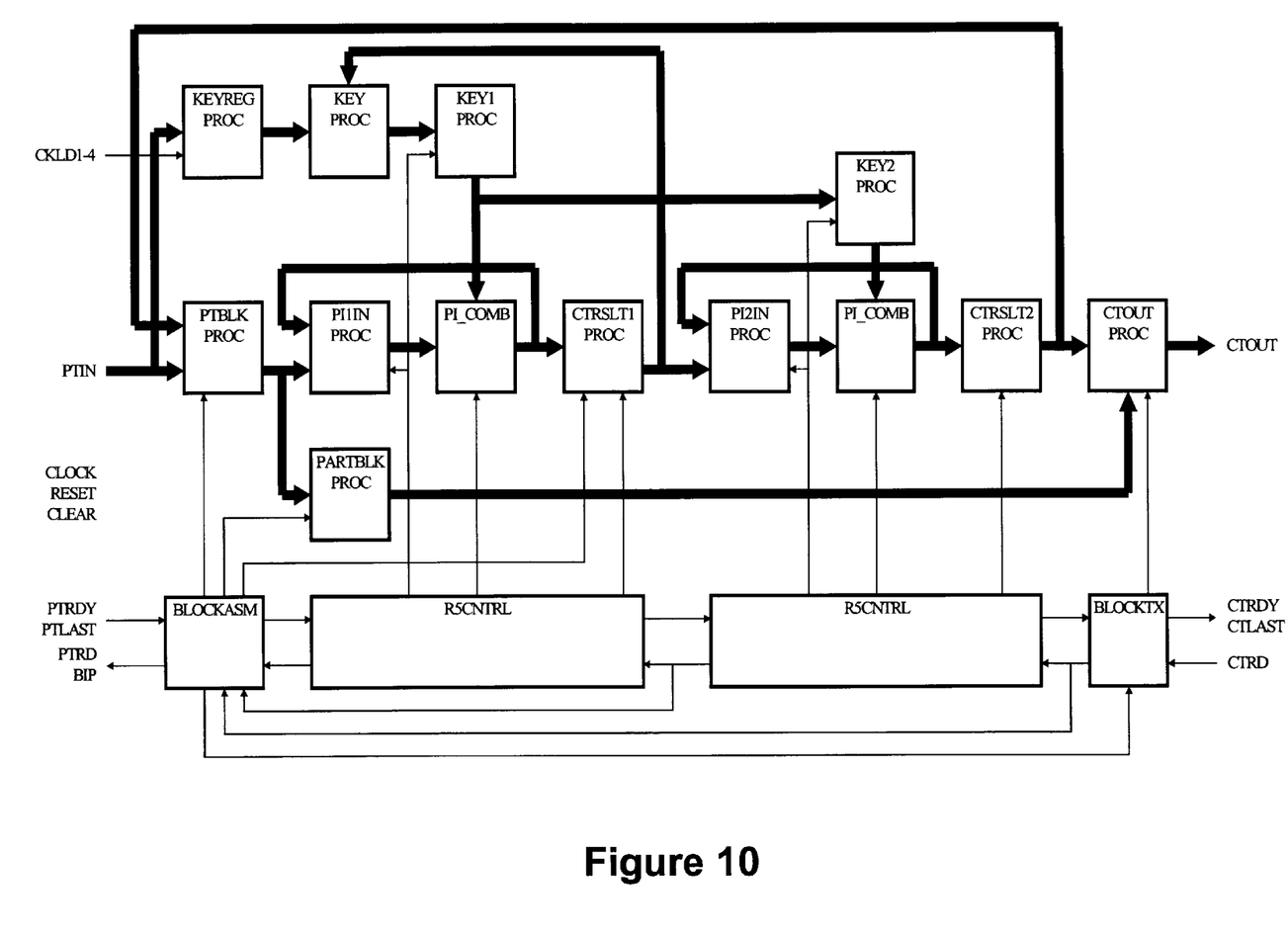
FIG. 10 is a structural block diagram of a fast cipher core according to an embodiment of the present invention.

In one embodiment, the top level design entity of the fast cipher core comprises the m6_fast component. FIG. 10 is a structural block diagram of a fast cipher core according to an embodiment of the present invention. In one embodiment, the input and output ports of the fast cipher core may be defined in the following entity statement.

The Fast Cipher Core entity
library ieee;
use ieee.std_logic_1164.all; -- standard nine value logic system
use work.constants.all; -- global design parameters
entity m6_fast is
  port
    (clock: in std_logic; -- system clock
    clear: in std_logic; -- asynchronous clear
    reset: in std_logic; -- synchronous reset
    ptin: in std_logic_vector(WORDSIZE-1 downto 0); -- plain text
    ptrdy: in std_logic; -- plaintext word ready
    ptlast: in std_logic; -- last plaintext word ready
    ptrd: out std_logic; -- plaintext word read
    ctout: out std_logic_vector(WORDSIZE-1 downto 0); -- cipher text
    ctrdy: out std_logic; -- ciphertext word ready
    ctlast: out std_logic; -- last ciphertext word ready
    ctrd: in std_logic; -- ciphertext word read
    bip: out std_logic; -- block in progress
    ckld1: in std_logic; -- content key word 1 load
    ckld2: in std_logic; -- content key word 2 load
    ckld3: in std_logic; -- content key word 3 load
    ckld4: in std_logic); -- content key word 4 load
end m6_fast;

The I/O interface to the fast cipher core is the same as was used in the small cipher core. The Block Assembler component, Combinatorial and Sequential PI Function components, and the Block Transmit component for the fast cipher core are the same as were used in the small cipher core.

The two Five Round Controller components, r5ctrl, control the encryption of the individual 64-bit plaintext blocks. They include a timer, which sets the duration of each round allowing signals to settle through the Pi Function and a state machine which keeps track of the rounds. Two Five Round Controllers and two Pi Functions are used in the fast cipher core to create a two stage pipeline. The first stage executes rounds 1–5 while the second stage executes rounds 6–10. In this manner, two blocks of plaintext may be processed concurrently, effectively doubling the throughput of the cipher. In one embodiment, the input and output ports of the Five Round Controllers may be defined in the following entity statement.

The Five Round Controller entity
library ieee;
use ieee.std_logic_1164.all;
entity r5ctrl is
  generic
    (ROUNDDLY: positive:=3; -- round delay
    CNTRBITS: positive:=2); -- round delay counter bits
  port
    (clock: in std_logic; -- system clock
    clear: in std_logic; -- asynchronous clear
    reset: in std_logic; -- synchronous reset
    go: in std_logic; -- cipher go bipin: in std_logic; -- block in progress (next stage)
blockrdy: out std_logic; -- ciphertext block done
enrnd1: out std_logic; -- enable round 1
enrnd2: out std_logic; -- enable round 2
enrnd3: out std_logic; -- enable round 3
enrnd4: out std_logic; -- enable round 4
enrnd5: out std_logic; -- enable round 5
ldrslt: out std_logic; -- load the result register
ldfdbk: out std_logic; -- load the feedback register
ldnxtblk: out std_logic; -- load the next plain text block
bip: out std_logic); -- block is in progress
end r5ctrl;

Input signal go starts the Five Round Controller's state machine. Input signal bipin provides the Five Round Controller with the state of the next stage. Output signal blockrdy is used to start the next round once a block has processed. Output signals enrnd1–5 may be used to select the Pi Function variant to be used on a per round basis. Output signal ldrslt may be used store a block once processing has completed. Output signals ldfdbk and ldnxtblk may be used to select the source of data for the Pi Function. Output signal Ldfdbk selects the Pi Function output in preparation for execution of the next round. Output signal Ldnxtblk selects the preceding stage's output to begin processing the next block. Output signal bip provides the next stage with the status of the Five Round Controller.

Thus, three embodiments of a cipher core of a content cipher subsystem have been described. Depending on system requirements, selected ones of these embodiments may be used to assist in protecting data being communicated over a digital transmission line such as an IEEE 1394 bus.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. An apparatus for encrypting data comprising:
a block assembler to receive words of plaintext data from a message parser in an encrypt data message and to assemble the words into a block;
an encryption function coupled to the block assembler to encrypt the block into ciphertext data based on an encryption function key;
a block transmitter coupled to the encryption function to receive the encrypted block and to disassemble the encrypted block into ciphertext data words;
a controller coupled to the block assembler, the encryption function, and the block transmitter to control multiple rounds of encryption by the encryption function for the block; and
a key generator coupled to the encryption function to accept a content key and to generate the encryption function key from the content key, the encryption function key being used by the encryption function to encrypt the block.

2. The apparatus of claim 1, wherein the key generator comprises a feedback register to store ciphertext feedback data received from the encryption function for use by the key generator in generating the encryption function key.

3. The apparatus of claim 1, wherein the controller controls ten rounds of encryption processing for the block.

4. The apparatus of claim 1, wherein the encryption function encrypts the block according to a M6-S56 cipher.

5. The apparatus of claim 1, wherein the encryption function comprises combinatorial logic.

6. The apparatus of claim 1, wherein the encryption function comprises sequential logic.

7. The apparatus of claim 1, wherein the block assembler comprises circuitry to assemble a block from multiple data words and to initiate processing by the controller whenever a block is ready to be processed.

8. The apparatus of claim 1, wherein the controller comprises a timer to set a duration for each round and a state machine to control processing of the rounds.

9. The apparatus of claim 1, wherein the block transmitter comprises circuitry to disassemble an encrypted block into multiple encrypted data words and to transfer the encrypted data words to a bus interface.

10. An apparatus for encrypting data comprising:
a block assembler to receive words of data and to assemble the words into a block;
first and second encryption functions coupled to the block assembler to encrypt the block based on an encryption function key;
a block transmitter coupled to the first and second encryption functions to receive the encrypted block and to disassemble the encrypted block into encrypted data words;
a first controller coupled to the block assembler and the first encryption function to control a first set of rounds of encryption for the block by the first encryption function; and
a second controller coupled to the first controller and the second encryption function to control a second set of rounds of encryption for the block by the second encryption function.

11. The apparatus of claim 10, wherein the first set of rounds comprises rounds one through five of a cipher and the second set of rounds comprises rounds six through ten of the cipher.

12. The apparatus of claim 10, wherein the encryption functions comprise combinatorial logic.

13. The apparatus of claim 10, wherein the encryption functions comprise sequential logic.

14. The apparatus of claim 10, wherein the first controller comprises a first timer to set a first duration for each of rounds one through five and a first state machine to control rounds one through five.

15. The apparatus of claim 10, wherein the second controller comprises a second timer to set a second duration for each of rounds six through ten and a second state machine to control rounds six through ten.

16. A cipher system comprising:
a cipher core to encrypt plaintext data into ciphertext data; and
a bus interface coupled to the cipher core to transfer the ciphertext data to a bus;
wherein the cipher core comprises:
a block assembler to receive words of plaintext data from the message parser in an encrypt data message and to assemble the words into a block;
an encryption function coupled to the block assembler to encrypt the block into ciphertext data based on an encryption function key;
a block transmitter coupled to the encryption function to receive the encrypted block, to disassemble the encrypted block into ciphertext data words, and to forward the ciphertext data words to the bus interface;

a controller coupled to the block assembler, the encryption function, and the block transmitter to control multiple rounds of encryption by the encryption function for the block; and a key generator coupled to the message parser and the encryption function to accept a content key from the message parser and to generate the encryption function key from the content key, the encryption function key being used by the encryption function to encrypt the blocks.

17. The cipher system of claim 16, wherein the bus comprises an IEEE 1394 bus.

18. The cipher system of claim 16, wherein the cipher core comprises a M6-S56 cipher.

19. The cipher system of claim 16, further comprising a processor interface coupled to the message parser to receive messages from a processor.

20. The cipher system of claim 16, wherein the key generator comprises a feedback register to receive ciphertext feedback data from the encryption function for use by the key generator in generating the encryption function key.

21. A cipher system comprising:

a cipher core to encrypt plaintext data into ciphertext data; and a bus interface coupled to the cipher core to transfer the ciphertext data to a bus;

wherein the cipher core comprises:

a block assembler to receive words of plaintext data and to assemble the words into a block;

first and second encryption functions coupled to the block assembler to encrypt the block into ciphertext data based on an encryption function key;

a block transmitter coupled to the first and second encryption functions to receive the encrypted block and to disassemble the encrypted block into ciphertext data words;

a first controller coupled to the block assembler and the first encryption function to control a first set of rounds of encryption for the block by the first encryption function; and a second controller coupled to the first controller and the second encryption function to control a second set of rounds of encryption for the block by the second encryption function.

22. The apparatus of 21, wherein the first set of rounds comprises rounds one through five of a cipher and the second set of rounds comprises rounds six through ten of the cipher.

23. An apparatus for encrypting data comprising:

means for receiving words of plaintext data from a message parser in an encrypt data message and for assembling the words into a block;

means for encrypting the block into ciphertext data based on an encryption function key;

means for receiving the encrypted block and for disassembling the encrypted block into ciphertext data words;

means for controlling multiple rounds of encryption for the block; and means for accepting a content key and for generating the encryption function key from the content key, the encryption function key being used to encrypt the block.

24. An apparatus for encrypting data comprising:

means for receiving words of data and for assembling the words into a block;

first and second means for encrypting the block based on an encryption function key;

means for receiving the encrypted block and for disassembling the encrypted block into encrypted data words;

first controlling means, coupled to the receiving and assembling means and the first encrypting means, for controlling a first set of rounds of encryption for the block; and second controlling means, coupled to the first controlling means and the second encrypting means, for controlling a second set of rounds of encryption for the block.

25. The apparatus of 24, wherein the first set of rounds comprises rounds one through five of a M6-S56 cipher and the second set of rounds comprises rounds six through ten of the M6-S56 cipher.

\* \* \* \* \*